No. 636,629. Patented Nov. 7, 1899.
C. BUTCHER.
BICYCLE RACK AND LOCKING DEVICE.
(Application filed May 2, 1899.)
(No Model.)

Witnesses:
Karl A. Andrén.
William W. Lummus.

Inventor
Charles Butcher.
by
Alvan Andrén.
his atty.

UNITED STATES PATENT OFFICE.

CHARLES BUTCHER, OF CAMBRIDGE, MASSACHUSETTS.

BICYCLE RACK AND LOCKING DEVICE.

SPECIFICATION forming part of Letters Patent No. 636,629, dated November 7, 1899.

Application filed May 2, 1899. Serial No. 715,289. (No model.)

*To all whom it may concern:*

Be it known that I, CHARLES BUTCHER, a citizen of the United States, residing at Cambridge, in the county of Middlesex and State of Massachusetts, have invented new and useful Improvements in Bicycle Racks and Locking Devices, of which the following is a specification.

This invention relates to improvements in a combined bicycle rack and locking device for the purpose of holding a bicycle in an upright position and securely locking it when not in use, as will hereinafter be more fully shown and described, reference being had to the accompanying drawings, wherein—

Figure 1:
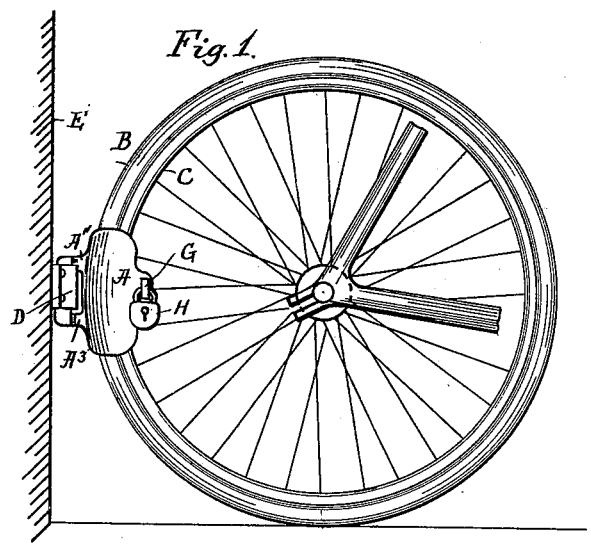
Figure 2:
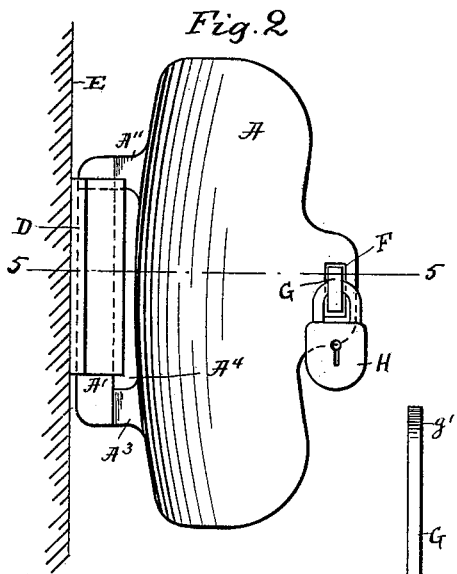
Figures 3, 4, 6:
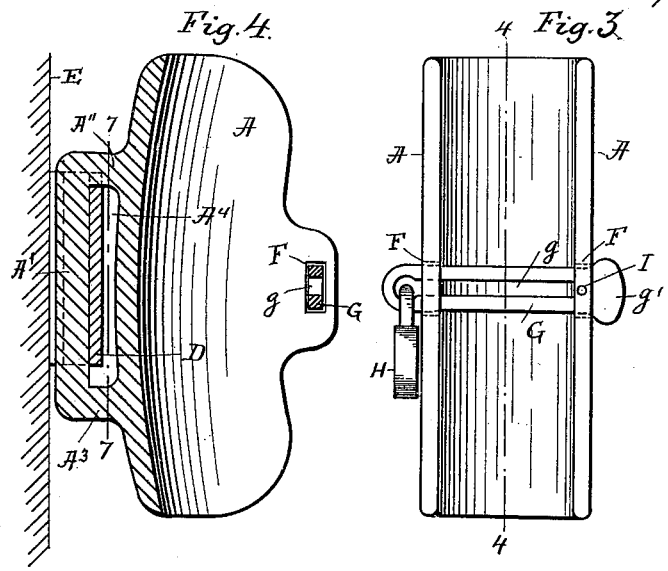
Figure 5:
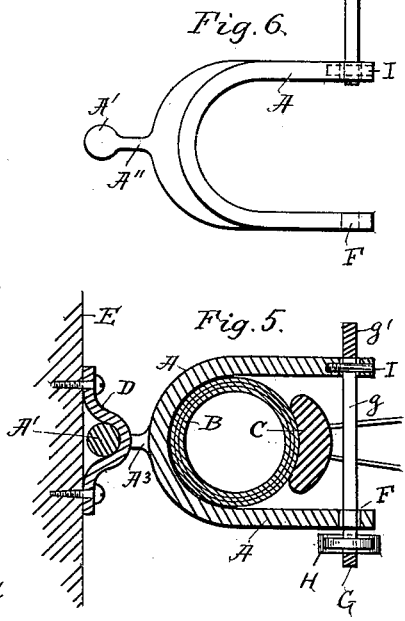
Figures 7, 9:
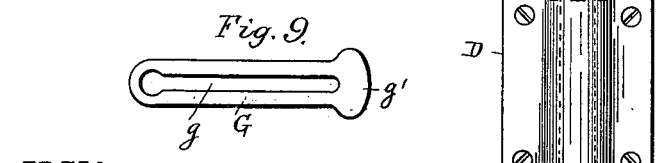
Figure 8:
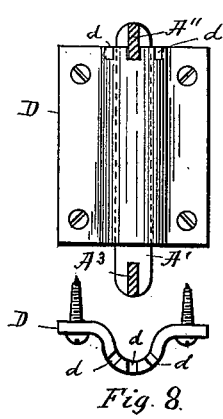

Figure 1 represents a side elevation of the improved device, showing the rear wheel of a bicycle held and locked therein. Fig. 2 represents a detail side elevation of the said improved rack. Fig. 3 represents an end view of the same. Fig. 4 represents a vertical section on the line 4 4, shown in Fig. 3. Fig. 5 represents a cross-section on the line 5 5, shown in Fig. 2. Fig. 6 represents a top plan view of the device, showing the hinge-plate or wall-bracket removed and the lock-bar drawn out of locked position relative to the rack. Fig. 7 represents a vertical section on the line 7 7, shown in Fig. 4. Fig. 8 represents a top plan view of the wall-bracket or hinge-plate, and Fig. 9 represents a detail side elevation of the slotted lock-bar.

Similar letters refer to similar parts wherever they occur on the different parts of the drawings.

The device consists of a forked metal rack or wheel-holder A, adapted to receive a portion of the tire B and rim C of a bicycle-wheel, as shown. At the rear of said forked rack is arranged a vertical hinge-pin A', which is connected at its top and bottom to the rack A by means of ribs A" A³, made integral with the hinge-pin A' and rack A. Between the said hinge-pin A' and rear of the rack A is a vertical slot A⁴, through which a clip-plate D is introduced previous to securing said clip-plate to the wall E or other stationary object, as shown. The metal clip-plate has screw-holes near its vertical edges, by which it may be rigidly fixed by screws to the wall or support E, and centrally between the vertical edges it is formed with a vertical bend, semicircular in cross-section, in which the cylindrical hinge-pin A' fits and turns. The clip-plate is of a height less than the distance between the upper and lower ribs or webs A" A³, which rigidly connect the upper and lower ends of the hinge-pin to the forked holder A, whereby the hinge-pin can be raised and lowered in the semicircular bend, and is limited in its up-and-down movements by said ribs or webs A³ A". The upper edge of the bend is constructed with a plurality of notches $d$, with any of which the upper rib or web A" can be engaged.

If it is desired to hold the rack at or about a right angle relative to the wall E, I simply raise the rack relative to the clip-plate D and swing the said rack until its rib A" comes directly above the middle notch $d$ in the clip-plate, after which I lower the rack until said rib A" is caused to enter such middle notch, when the rack will be automatically retained in the desired position. If it is desired to hold the rack at any other angle relative to the wall, all that is necessary to do is to raise the rack, as before, until its rib A" is disengaged from the notch in the upper edge of the clip-plate, after which the rack may be swung to the right or left and locked into any of the side notches of the said hinge-plate. This is very advantageous, as it may not always be convenient to place the bicycle at a right angle to the wall or other stationary object on which the hinge-plate is secured. In connection with said bicycle-rack I use a device for securely locking the wheel in position, which is constructed as follows: Through the outer side portions of the forked rack A are made perforations F F, adapted to receive a sliding lock-bar G, provided with a longitudinal slot $g$, as shown in the drawings. Said lock-bar G has at one end a head or projection $g'$ to prevent the said bar from being detached from the rack when its opposite end is locked by the padlock H, as shown in Figs. 1, 2, 3, 5, and 9. For the purpose of preventing the said slotted lock-bar from being entirely disconnected from the rack I insert and secure to one of the cheeks of the rack a pin I, (shown in Figs. 3, 5, and 6,) which passes loosely through the slot $g$ in the said lock-bar G, which pin prevents the said lock-bar from being drawn out farther than to the position shown in Fig. 6.

The invention is very simple and serves as an effective means for holding and securing a bicycle in place, thus preventing its being carried away or stolen.

What I wish to secure by Letters Patent and claim is—

A bicycle-locking rack, comprising a forked holder having rearwardly-projecting upper and lower ribs or webs, a vertical hinge-pin uniting the ribs or webs, a locking-bar passing through the two members of the forked holder, and a clip-plate having a central, vertical semicylindrical bend formed between its ends and provided at its upper edge with a plurality of locking-notches arranged at different angles to the flat vertical plane of said clip-plate, the vertical hinge-pin being journaled and vertically movable in the bend in the clip-plate to engage its upper rib or web with any one of the locking-notches, the said hinge-pin between the upper and lower ribs or webs being of greater length than the bend in the clip-plate whereby the hinge-pin is capable of a limited vertical movement, substantially as described.

In testimony whereof I have hereunto set my hand in presence of two subscribing witnesses.

CHARLES BUTCHER.

Witnesses:
ALBAN ANDRÉN,
KARL A. ANDRÉN.